(12) United States Patent
Reed et al.

(10) Patent No.: US 8,534,734 B2
(45) Date of Patent: Sep. 17, 2013

(54) ANIMAL BARRIER FOR VEHICLES

(75) Inventors: Michael Reed, Finedon Northants (GB); Martyn Philip Oxby, Kings Lynn (GB)

(73) Assignee: Lead Innovations Ltd., Norfolk (GB)

( * ) Notice: Subject to any disclaimer, the term of this patent is extended or adjusted under 35 U.S.C. 154(b) by 0 days.

(21) Appl. No.: 13/384,665

(22) PCT Filed: Jul. 21, 2010

(86) PCT No.: PCT/GB2010/051201
§ 371 (c)(1),
(2), (4) Date: Apr. 9, 2012

(87) PCT Pub. No.: WO2011/010153
PCT Pub. Date: Jan. 27, 2011

(65) Prior Publication Data
US 2012/0181808 A1    Jul. 19, 2012

(30) Foreign Application Priority Data
Jul. 22, 2009   (GB) .................................. 0912783.8

(51) Int. Cl.
*B60R 21/02*   (2006.01)
(52) U.S. Cl.
USPC .................................... 296/24.43; 296/24.31
(58) Field of Classification Search
USPC ............ 296/24.43, 24.31, 37.16, 24.4, 24.46; 160/DIG. 2; 280/749, 748; 119/412, 414; D12/414
See application file for complete search history.

(56) References Cited

U.S. PATENT DOCUMENTS

| 3,044,800 | A | * | 7/1962 | Wicker | 280/748 |
| 4,653,562 | A | * | 3/1987 | Moss et al. | 160/105 |
| 4,848,832 | A | | 7/1989 | Starnes | |
| 5,192,112 | A | * | 3/1993 | Gherardi et al. | 296/190.1 |
| 7,017,520 | B2 | | 3/2006 | Wang | |

FOREIGN PATENT DOCUMENTS

| GB | 1588292 | 4/1981 |
| GB | 2222358 | 3/1990 |
| GB | 2435859 | 9/2007 |

* cited by examiner

*Primary Examiner* — Jason S Morrow
(74) *Attorney, Agent, or Firm* — Keusey & Associates, P.C.

(57) ABSTRACT

An animal barrier for use in a vehicle is formed by a frame having an opening therein, and partition members mounted to the frame. First and second partition members are spaced apart to define the opening therebetween and are moveable relative to the frame so as to vary the width of the barrier and the width of the opening. A third partition member is slidably mounted to the frame so as to be moveable between a closed position in which it overlies the opening so as to substantially close the opening, and an open position in which is removed from the opening. In the open position, the third partition member may be located to one side of the opening, overlapping one of the first and second partition members or may be located above or below the opening, away from the first and second partition members.

4 Claims, 5 Drawing Sheets

ANIMAL BARRIER FOR VEHICLES

BACKGROUND OF THE INVENTION

1. Field of the Invention

The present invention relates to a barrier mountable between the passenger area and load carrying area of a vehicle for safely containing an animal in said load carrying area during transit, and, in particular to such a barrier with means to allow access to the animal from the passenger area.

2. The Prior Art

Safety barriers designed to prevent an animal in the boot of a vehicle gaining access to the passenger seating area exist in many forms, the desirable characteristics of which include ease of assembly, robustness, reliability and aesthetic appearance.

U.S. Pat. No. 7,017,520 is one such example of prior art in this field and describes a pet separation device comprising two parallel vertical posts mounted to a netted frame. Suction members on each end of both vertical posts enable said posts to be removably fastened to the floor and the ceiling of the vehicle respectively such that the netted frame can be positioned to form a barrier between the vehicle boot and rear passenger area.

Conventional barriers prevent an animal, such as a pet dog, gaining access to the rest of the vehicle from the boot, which is of particular importance when the vehicle is in transit. However, use of these barriers carries the inherent risk of trapping the animal in the boot in the event that a rear collision should mean it is not possible to open the boot door. In addition to this, a passenger may wish to feed or comfort the animal during transit but would be prevented from doing so by the presence of a barrier such as that shown in U.S. Pat. No. 7,017,520.

SUMMARY OF THE INVENTION

According to the present invention, there is provided an animal barrier for use in a vehicle, the barrier comprising a frame and at least one partition member, the at least one partition member being mounted to the frame such that it can move relative to the frame between a first substantially closed position in which the partition member forms a barrier preventing access through an opening in said frame and a second substantially open position in which the partition member is offset from said opening so as to allow access through said frame.

A barrier in accordance with the invention has the advantage that the movement of an animal within a vehicle can be confined whilst not endangering the animal by removing a means of exiting said vehicle. Furthermore, the moveable nature of at least one partition member means a passenger can have unrestricted access to the confined animal during transit should they, for example, wish to feed or comfort them—there being no need to stop the vehicle and open the boot in order to do this, as is the case in the prior art.

Preferably the barrier comprises at least a first and second partition member. Advantageously, at least the first partition member is moveable relative to the frame to open and close the opening.

In a first preferred embodiment the barrier comprises a third partition member. The first and second partition members are, preferably, spaced apart along the width of the barrier and may be moveable along said width so as to vary the size of, but not close, the opening such that the barrier can fit in cars of various sizes. Advantageously, the third partition member is moveable perpendicular to the width of the frame, in particular being moveable between the first substantially closed position and the second substantially open position.

In an alternate preferred embodiment the barrier comprises at least four partition members, wherein the third and fourth partition members move apart relative to each other along the width of the barrier between the first substantially closed position and the second substantially open position.

Preferably, each moveable partition member is slidably mounted to the frame for movement relative thereto, however in an alternate preferred embodiment at least one partition member may be hingedly mounted to said frame.

Furthermore, the moveable partition members may advantageously be located on at least two different tracks so as to enable them to overlap each other. In this way, for example, in an arrangement having two moveable partition members, they may be moved into a position in which they fully overlap each the and one of the side panels to maximise the size of the opening. In a still further embodiment, four moveable panels may be provided, grouped into pairs with each panel of a pair being configured so as to be fully overlapable with the other panel of said pair, the overlapping panels, in turn, being moveable into a position in which they are fully retracted from the opening and fully overlapping an associated side panel. Each pair of panels then cooperate to extend from each other in series in an extended position in order to cover half of the opening. In this way, the size of the side panels can be minimised and hence the size of the opening maximised.

At least one partition member may be trapezoidal in shape so as to substantially conform to the vehicle interior. Furthermore, the at least one trapezoidal partition member may include a substantially rectangular cutout portion at a corner so as to further conform to the vehicle interior.

Advantageously, the frame comprises two upright posts which span the interior height of the vehicle and secure the barrier in the load carrying area of the vehicle. Preferably the posts are removably secured to the floor and ceiling of the vehicle interior, said posts being variable in length such that they can be adjusted to span vehicle interiors of different heights. Further advantageously, adjustable feet are secured to the ends of each post such that said feet can form a friction tight fit against the vehicle interior. A partition member associated with each side of the barrier may, in a particularly preferred embodiment, be fixedly attached to each upright post so as to be fast therewith, each upright post being moveable laterally along at least one horizontal support bar to adjust the separation between the upright posts, the associated partition member moving with each said post to adjust the width of the barrier.

A clip or other fastening means known in the art may be used to secure the movable partition in place when in the first substantially closed position, second substantially open position or any position therebetween. Advantageously, netting may be used to form at least one partition, though, finally, it will be apparent that a partition may not include netting and may be formed of any material suitable to provide a robust barrier.

BRIEF DESCRIPTION OF THE DRAWINGS

In order that the invention may be well understood, there will now be described an embodiment thereof, given by way of example, reference being made to the accompanying drawings, in which.

DETAILED DESCRIPTION OF THE PREFERRED EMBODIMENT

Figure 1:
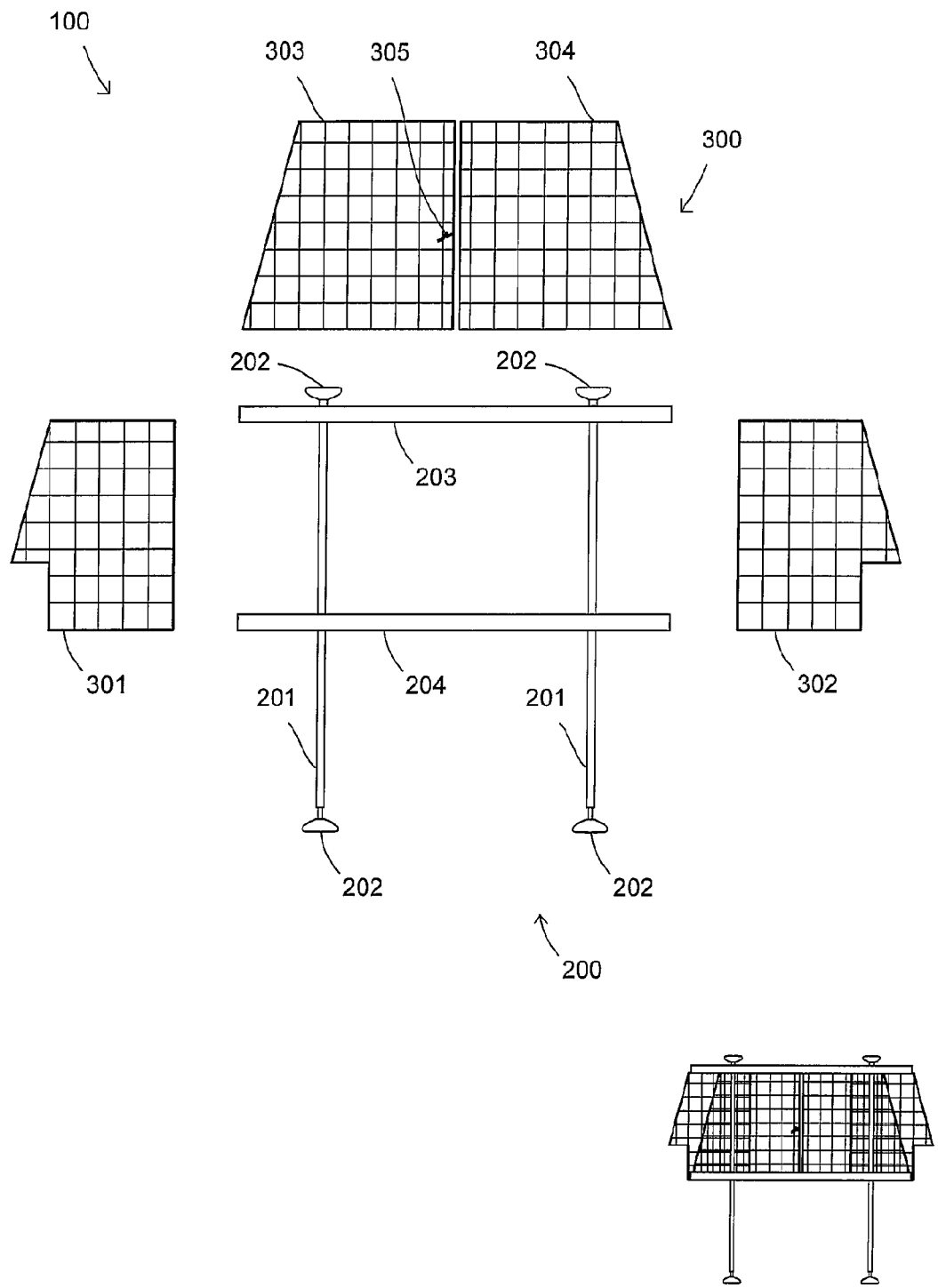
FIG. 1 is an exploded view of a first embodiment of the barrier, showing the frame and partition members.
Figure 3:
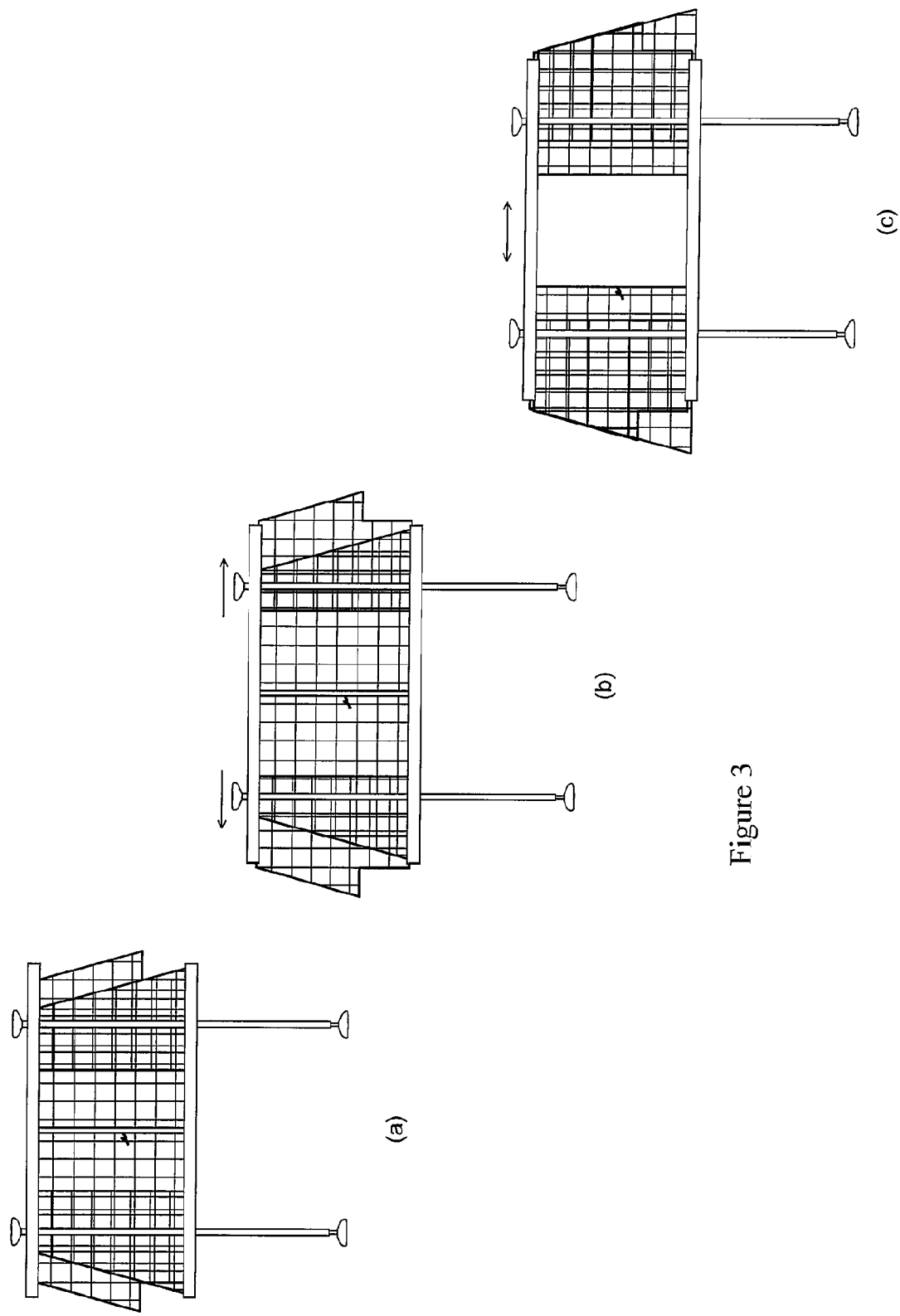
FIGS. 3(a), (b) and (c) are views of the first embodiment of the barrier showing various positions of the partition members.

Referring first to FIGS. 1 and 3, there is shown an adjustable barrier 100 for an animal such as a dog or other domesticated creature, that, in use, mounts in a vehicle to provide a barrier between the load carrying and passenger areas of said vehicle and thus prevent movement of said animal between those areas.

The barrier 100 comprises two main elements—a frame 200 and netted partition members 300. The frame 200 comprises two substantially parallel posts 201 that, in use, are removably secured, substantially upright, to the boot floor and ceiling of the vehicle. Feet 202 are secured to the ends of each post 201 and the length of each post 201 is adjustable such that a friction tight fit can be achieved between the feet 202 and the vehicle. The adjustable nature of the length of each post 201 also means a wide range of vehicle sizes can be accommodated.

First and second guide rails 203, 204 are secured to the posts 201, opposite each other and perpendicular thereto. The first guide rail 203 is secured proximate to the top end of each substantially upright post 201 and the second guide rail 204 is secured parallel to, and below, the first guide rail 203, proximate to the mid-point of the upright posts 201.

The partition members 300 then complete the barrier 100 by slidably mounting to the frame 200 via the first and second guide rails 203, 204. In a first preferred embodiment of the invention four partition members 300 are present. When viewed from the front the left and right partitions 301, 302 are slidably mounted proximate to the left and right ends respectively of the guide rails 203, 204 and two central partitions 303, 304 are slidably mounted between the left and right partitions 301, 302.

As shown in FIGS. 1 and 3, each partition member 300 of the first embodiment of the invention is substantially trapezoidal in shape with a cutout corner portion, each partition being made up of a quadrilateral having only two parallel sides and one side sloping inwardly from bottom to top, the cutout portion being at the lower corner adjacent to the sloping side. In use, the left and right partitions are positioned with the sloping side proximate to the left and right sides of the vehicle respectively. The central partitions 303, 304 are similarly orientated with left and right sides sloping inwardly proximate to the left and right vehicles sides. As such, the shape of each partition accommodates the inwardly tapering interior common to most vehicles.

In use, the barrier 100 is removably mounted in the load carrying area of a vehicle, behind the rear passenger headrests to prevent an animal moving from said load carrying area over the rear seats and into the passenger area. The effective width of the barrier can be altered to accommodate various vehicle widths by extending and retracting the slidable left and right partitions 301, 302 horizontally along the guide rails 203, 204. This is shown in FIGS. 3(a) and 3(b). Such guide rails are within the practical knowledge of the skilled person and will not, therefore, be described here in greater detail.

The central partitions 303, 304 similarly slide horizontally left and right respectively to allow access to the load carrying area from the rear passenger seats, as shown in FIG. 3(c). A clip 305 is used to secure the central partitions together such they do not slide apart accidentally during transit.

Figure 2:
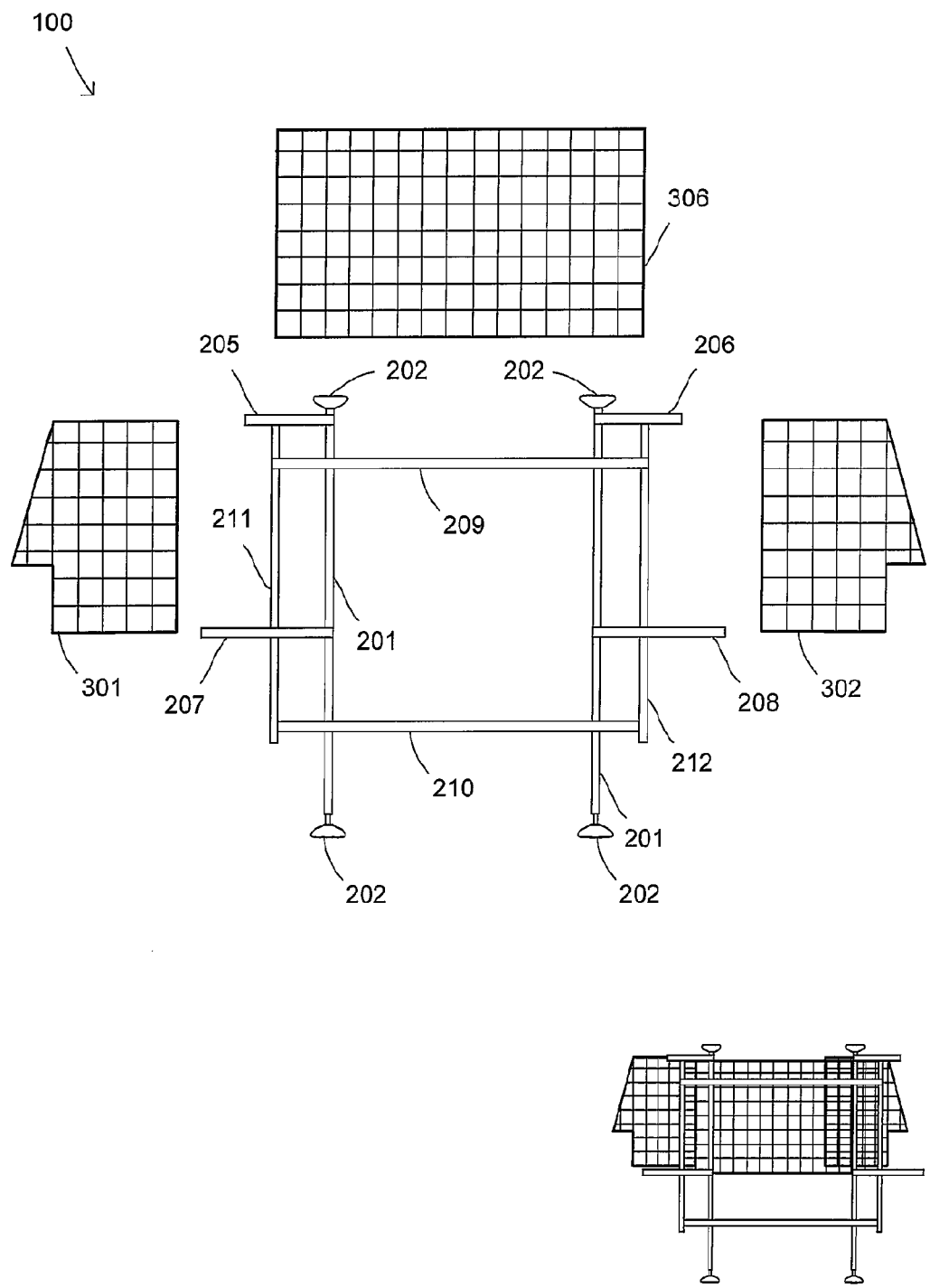
FIG. 2 is an exploded view of a second embodiment of the barrier, showing the frame and partition members.
Figure 4:
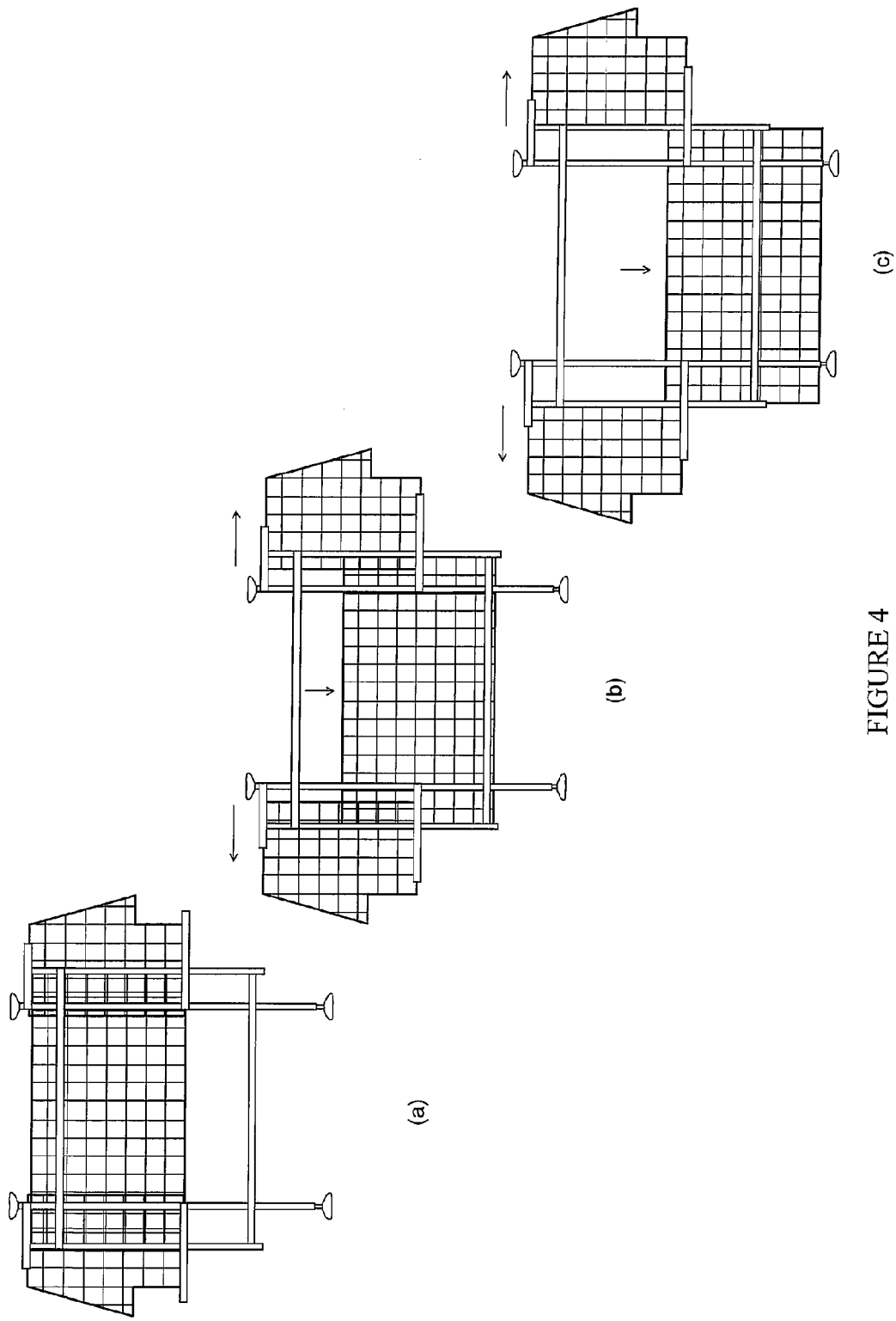
FIGS. 4(a), (b) and (c) are views of the second embodiment of the barrier showing various positions of the partition members.

In an alternate preferred embodiment, as shown in FIGS. 2 and 4, a single central partition member 306 is used. This central partition 306 does not slide horizontally left or right as in the previous embodiment, but slides vertically to allow access from the passenger area to the load carrying area.

As in the previous embodiment, a frame 200 comprising guide rails is secured to two vertical posts 201, said posts being adjustable in length and with feet 202 at each end to enable said frame 200 to be similarly mounted in a vehicle with a friction tight fit. Whereas the guide rails 203, 204 of the previous embodiment span the width of the frame 200, in this alternate embodiment a left upper guide rail 205 is secured proximate to the top end of the left substantially upright post 201 when the frame 200 is viewed from the front, and a right upper guide rail 206 is secured proximate to the top end of the right substantially upright post 201 and in the same horizontal plane as the left upper guide rail 205. The guide rails 205, 206 are secured perpendicular to posts 201, with the left upper guide rail 205 extending to the left and the right upper guide rail 206 extending to the right.

A left lower guide rail 207 positioned parallel to, and below, the left upper guide rail 205 enables a left partition member 301 to slidably mount therebetween and, in a similar fashion, a right lower guide rail 208 parallel to, and below, the right upper guide rail 206 supports a right partition member 302 slidably mounted therebetween—the left and right partition members 301, 302 being the same as those described in the previous embodiment.

To provide rigidity to the frame 200 of the barrier 100, upper and lower frame members 209, 210 are secured perpendicular to posts 201. The upper frame member 209 is secured proximate to the top end of posts 201 and below guide rails 205, 206 and the lower frame member 210 is secured proximate to the lower end of posts 201 and below guide rails 207, 208. Further frame rigidity is provided by two upright guide rails—a left upright guide rail 211 secured perpendicular to guide rails 205, 207 and proximate to the left end of frame members 209, 210 and a right upright guide rail 212 secured perpendicular to guide rails 206, 208 and proximate to the right end of frame members 209, 210. The central partition 306 is then slidably mounted therebetween.

As with the barrier of the previous embodiment, the effective width can be adjusted to fit various vehicle interiors by extending and retracting the slidable left and right partitions 301, 302 horizontally. This is shown in FIGS. 4(a), (b), and (c). Access to the load carrying area of the vehicle from the passenger area can then be achieved by slidably lowering the central partition 306 vertically between guide rails 211, 212 from a first position shown in FIG. 4(a) to a second position shown in FIG. 4(c). The central partition 306 is secured in the first position by resting on lower guide rails 207, 208.

Figure 5A:
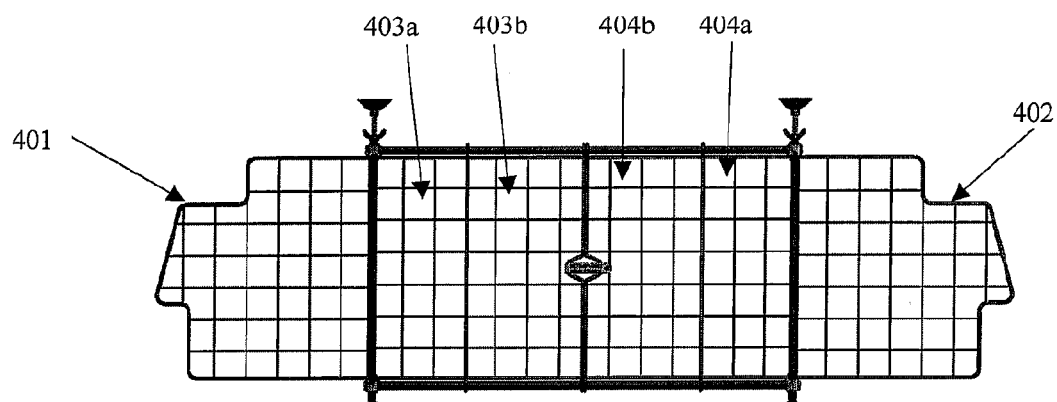
FIGS. 5a to 5c are views of a third embodiment of the barrier according to the invention.
Figure 5B:
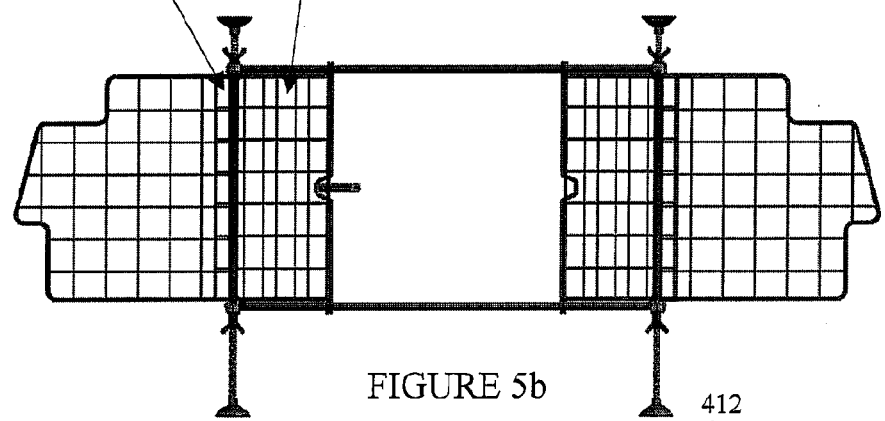
Figure 5C:
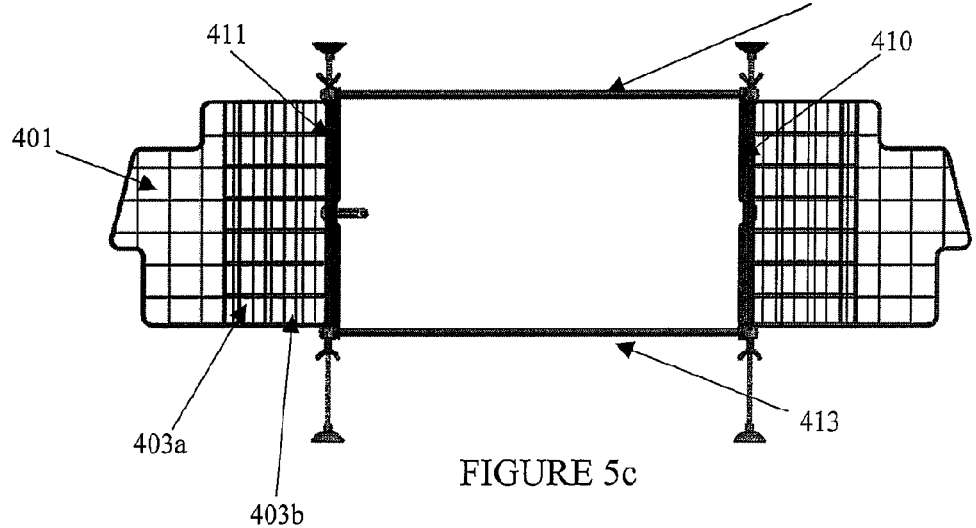

Referring now to FIGS. 5a to 5c, there is shown a still further embodiment of the present invention which is similar to the embodiment illustrated in FIG. 1 except that each central partition 303, 304 is replaced by a pair of partitions 403a, 403b, 404a, 404a, which cooperate together to close the gap. Each central partition is mounted for sliding movement along the horizontal side rails 412, 413 between a fully extended position illustrated in FIG. 5a in which each partition is extended away from the left/right partition 401, 402 and from each other, and a fully retracted position in which each partition of a part fully overlaps the other partition of the part as well as the associated left/right partition. More particularly, first left central partition 403a is constrained to move between a retracted position in which it is fully withdrawn from the opening and fully overlaps the left partition 401, and an extended position in which its left edge is substantially aligned with the right edge of the left partition 401. Second left central partition 403b, in turn, in its retracted position fully overlies the first left central partition 403a and in its extended position extends from the right edge of the first left central partition 403a so that the two left central partitions 403a, 403b together span half of the opening. In this way, the width of the left partition necessary to accommodate overlap of the left central partitions is reduced compared with the other embodiments and hence the width of the opening is increased, improving access.

Furthermore, in this embodiment, each of the left and right partitions 401, 402 is fixedly attached to left and right upright support 410, 411 respectively, each said upright support 410, 411, in turn, being slidably moveable along the horizontal bars 412, 413 to adjust the width of the frame. Suitable mechanism for achieving this movement relationship are well known in the art and will not be described any further at this time.

It will be appreciated that a combination of guide rails, frame members and partition members of the first embodiment of the invention could be used in conjunction with the guide rails, frame members and partition members of the second embodiment. It will also be appreciated that many different variations of guide rail, frame member and partition member size and configuration are possible, the important feature remaining that the barrier has accessibility means as disclosed herein and fits in vehicles of various size and shape. Similarly, many different variations of guide rail position and method of partition adjustment are possible, as well as alternative permanent and removable frame mounting means.

Finally, it is understood that the barrier could be used to safely contain other things, for example luggage, in the load carrying area of a vehicle, rather than purely animals.

The invention claimed is:

1. An animal barrier for use in a vehicle, the barrier comprising:
   a frame having an opening; and
   a first, second, third and fourth partition members mounted to the frame, wherein said first and second partition members are (i) spaced apart along the width of the barrier so as to define the opening therebetween and (ii) slidably moveable relative to the frame along said width so as to vary the size of, but not close, the opening, thereby enabling the size of the barrier to be adjusted to fit different vehicles, wherein said third and fourth partition members being slidingly movable relative to the frame between a first substantially closed position in which the third and fourth partition members substantially overlie part of the opening so as to cooperate to form a barrier preventing passage through said opening, and a second substantially open position in which the third and fourth partition members are each offset from said opening on opposing sides thereof so as to overlap the first and second partition members respectively and thereby allow passage through said frame.

2. The animal barrier according to claim 1, wherein each of said third and fourth partition members is formed of two sub-partition panels, each pair of sub-partition panels being slidably moveable on the frame between a fully extended position in which each pair of sub-partition panels between them extend across half the opening; a partially extended position in which each pair of sub-partition panels are extended away from the associated first and second partition members while fully overlapping each other so as to overlay only a quarter of the opening; and a retracted position in which each pair of sub-partition panels fully overlap each other and the associated first and second partition members so as to be completely withdrawn from the opening.

3. The animal barrier according to claim 1, wherein in said open position, each of said third and fourth partition members overlap a respective one of said first and second partition members and are substantially completely withdrawn from said opening, and in said closed position, each of said third and fourth partition members overlaps a respective half of the opening so as, together, to substantially close the opening.

4. The animal barrier according to claim 3, wherein each of said third and fourth partition members is formed of two sub-partition panels, each pair of sub-partition panels being slidably moveable on the frame between a fully extended position in which each pair of sub-partition panels between them extend across half the opening; a partially extended position in which each pair of sub-partition panels are extended away from the associated first and second partition members while fully overlapping each other so as to overlay only a quarter of the opening; and a retracted position in which each pair of sub-partition panels fully overlap each other and the associated first and second partition members so as to be completely withdrawn from the opening.

* * * * *